United States Patent
Nadeau et al.

(10) Patent No.: US 7,416,642 B2
(45) Date of Patent: Aug. 26, 2008

(54) SYSTEM FOR COOLING A HEATED JUICE BY PARTIAL LOW-PRESSURE EVAPORATION

(75) Inventors: Jean-Pierre Nadeau, Gradignan (FR); Dominique Cadiot, Monclar d'Agenais (FR); Patrick Sebastian, Villenave d'Ornon (FR); David Callede, Sarlat (FR)

(73) Assignee: Centre National de la Recherche Scientific (CNRS), Paris (FR)

( * ) Notice: Subject to any disclaimer, the term of this patent is extended or adjusted under 35 U.S.C. 154(b) by 528 days.

(21) Appl. No.: 10/479,223

(22) PCT Filed: May 29, 2002

(86) PCT No.: PCT/FR02/01810

§ 371 (c)(1),
(2), (4) Date: May 4, 2004

(87) PCT Pub. No.: WO02/096530

PCT Pub. Date: Dec. 5, 2002

(65) Prior Publication Data

US 2004/0173449 A1  Sep. 9, 2004

(30) Foreign Application Priority Data

May 31, 2001 (FR) .................... 01 07177

(51) Int. Cl.
- *B01D 3/06* (2006.01)
- *B01D 3/10* (2006.01)
- *B01D 5/00* (2006.01)
- *C12G 1/02* (2006.01)

(52) U.S. Cl. .......... 202/186; 99/277; 159/2.1; 159/18; 202/153; 202/160; 202/197; 202/205

(58) Field of Classification Search .......... 99/277, 99/293; 159/2.1, 18.44, DIG. 16; 202/153, 202/158, 160, 186, 197, 205
See application file for complete search history.

(56) References Cited

U.S. PATENT DOCUMENTS

| | | | |
|---|---|---|---|
| 1,799,478 A | | 4/1931 | Peebles |
| 2,881,116 A | | 4/1959 | Siegfried |
| 3,627,582 A | * | 12/1971 | Dambrine et al. ............. 127/16 |
| 3,627,646 A | * | 12/1971 | Osdor .......................... 202/93 |
| 3,933,600 A | | 1/1976 | Dodge et al. |
| 4,287,019 A | * | 9/1981 | Standiford .................. 159/2.3 |
| 4,497,689 A | * | 2/1985 | Szucs et al. ................. 202/174 |
| 5,059,311 A | * | 10/1991 | Ganz .......................... 209/455 |
| 6,108,927 A | * | 8/2000 | Strzala ......................... 34/73 |
| 6,395,138 B1 | * | 5/2002 | Darredeau et al. .......... 202/158 |

FOREIGN PATENT DOCUMENTS

| | | |
|---|---|---|
| DE | 37 27 164 A1 | 3/1988 |
| DE | 198 26 682 A1 | 4/1999 |
| FR | 1.270.558 A | 9/1961 |
| FR | 2712147 A | 5/1995 |
| WO | WO 02/096530 A3 | 12/2002 |

* cited by examiner

*Primary Examiner*—Virginia Manoharan
(74) *Attorney, Agent, or Firm*—Buchanan Ingersoll & Rooney PC

(57) ABSTRACT

A system for cooling a heated juice by partial low-pressure evaporation, the system includes a vat with at least two compartments that are connected to each other through a variably positioned shutter element, where the juice is subjected to decreasing pressure reductions within the vat and the movement of the variably positioned shutter element creates a pulsed effect that removes solid particles contained in the juice.

12 Claims, 3 Drawing Sheets

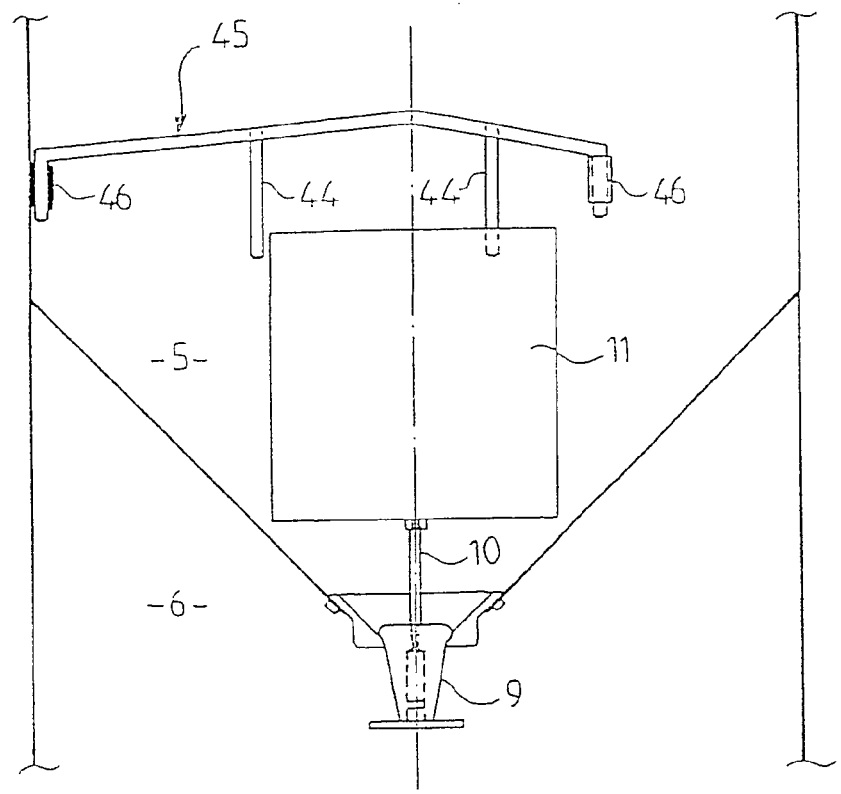
FIG. 3
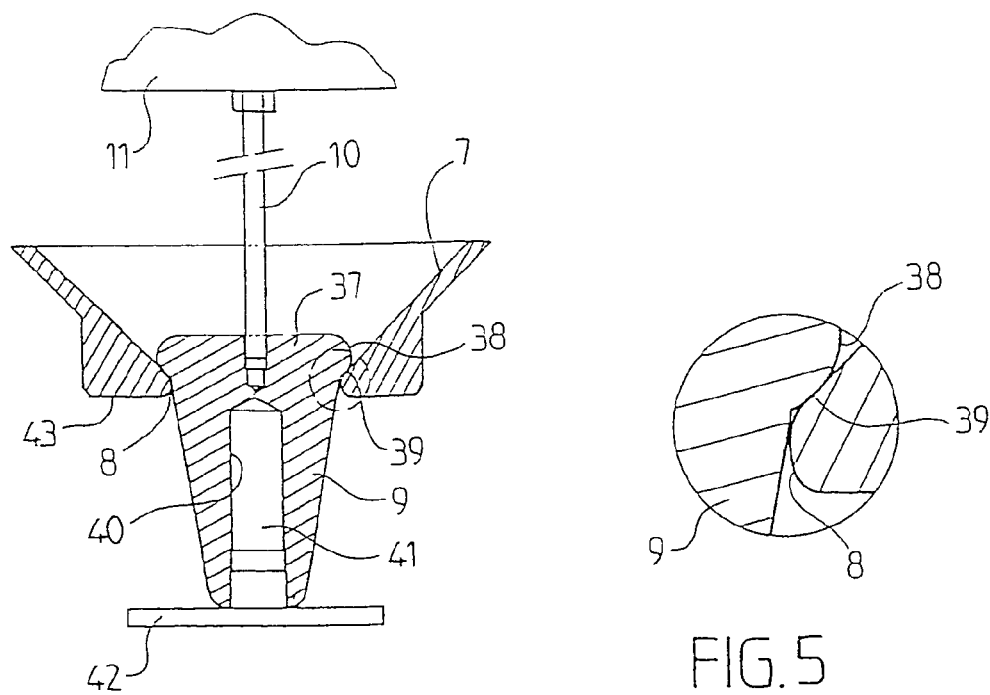
FIG. 4
FIG. 5

SYSTEM FOR COOLING A HEATED JUICE BY PARTIAL LOW-PRESSURE EVAPORATION

CROSS-REFERENCE TO PRIORITY/PROVISIONAL APPLICATIONS

This application is a national stage of PCT/FR02/01810 filed May 29, 2002 under 35 U.S.C. 371.

The present invention relates to an installation, allowing the controlled cooling, in carefully determined conditions, of a liquid juice, in particular charged with berries from an agricultural harvest, and applies more particularly although not exclusively to the treatment of juice from a harvested crop during the process of making it into wine.

It is known that the qualities of a wine, in particular its organoleptic properties, depend on its concentration and on its proportions in a certain number of flavouring matters, or even colouring agents, in particular of the aromatic type, precursors of aromas, tannins, pigments, anthocyanin compounds, and also various other more or less volatile compounds such as polyphenols and polysaccharides, which turn out to be essentially contained in the skin of grapes.

The French patent published under No. 2 712 147 describes a process for carrying out an initial treatment of a juice from a harvested crop with a view to extracting these compounds more effectively, by a mechanical disorganization of the cells in the skin of the grapes, encouraging their release and allowing the subsequent stages of making wine from the harvested juice to be optimized.

In particular this process consists, after having heated the juice which is to be treated to a temperature comprised between 80 and 95° C. for a few minutes by direct heating or by means of an exchanger to already develop certain organoleptic properties of this juice in a way which in itself is known in the prior art, of subjecting the thus heated liquid, in a closed vat, to a sudden drop in pressure which brings about its cooling down as a whole and at the same time causes a partial vaporization of the water contained in this juice, the vapour produced being then condensed and, as a general rule, returned to the cooled juice to satisfy the imposed regulations.

According to the patent cited, this pressure reduction under reduced pressure disorganizes the tissues of the grapes and breaks down the structure of the cells of its skin, while releasing a substantial quantity of precisely those compounds which are desired to be recovered, while avoiding their elimination with the solid residues which come from the pulp of the juice.

The thus treated juice, which comes out of the vat at relatively low temperature, in this case below 35° C., is then subjected to other standard stages of maceration, of more or less extended vat time, i.e. storage in the vat to allow the development of certain enzymatic or other reactions, before the fermentation begins, leading to the final development of the wine.

The process proposed in this previous patent thus allows a wine more charged with tannins to be obtained, having more structure and also a greater suppleness, and which is less sensitive to chemical alterations, all in all with a greatly improved storage time.

But if the stage of pre-heating followed by a sudden cooling by pressure reduction under reduced pressure has, according to the cited patent, incontestable advantages, it may be suspected that the entrainment of the aromas and other substances from the breaking down of the structure of the grape skins with the produced vapours is not optimal. In fact, the vapour produced by pressure reduction of the heated juice is fundamentally made up of water vapour so that the volatile or undesirable compounds remain contained in the cooled liquid part. This precisely means that the temperature of the juice from a harvested crop is lowered rapidly and significantly.

In fact, if the temperature were to remain above the limit of 30 to 35° C., fermentation of the juice would begin immediately under accelerated conditions, with harmful and irremediable consequences for the following stages of the winemaking process.

In consequence, in the process according to the previously cited patent, the cooling of the pre-heated juice constitutes a determining factor when it is seen in an overall perspective of winemaking.

However, the implementation of this process, which is moreover exclusively claimed in the cited patent in that it shows how to obtain a juice where the phenolic compounds and/or the precursors of aromas are present in a quantity which is 50% higher than that which is observed with baths which are treated by a standard process, requires, in order to obtain an adequate condensation of the vapour produced at the given temperature, because of the pressure reduction of the juice to low pressure, a condenser where the exchange surfaces are large and the flow-rate of the cooling fluid, made up of water, is very high.

From then on, the installation produced, where the pressure reduction of the juice heated at low pressure is obtained in a single vat of large dimensions, is not suited for localized treatment, in particular close to the site of each harvest, where the flow-rate of the available water is necessarily reduced, the temperature of this water at the site moreover not always being suited to the required cooling conditions.

The American patent published under No. 1 799 478 describes an evaporation and concentration device for a liquid heated and charged with solid matter comprising a vat which is continuously supplied with this liquid. Here, the vat comprises three separate compartments, which are superposed and communicating with each other, where the liquid is subjected to successive pressure reductions at decreasing pressures, each compartment being connected to a condenser.

However, the pressure reductions produced by this device are not sufficient, and the output of the installation as well as its large bulk make it not very efficient.

A subject of the present invention is an installation where the cooling of the heated juice by sudden pressure reduction under reduced pressure is carried out so that the flow rate of water required to condense the vapour produced is appreciably lower, the size of the condensers being smaller, the entrainment of the aromatic compounds and colouring agents in the vapour being more limited moreover, allowing essentially the juice itself to be treated, without involving the condensates subsequently returned to the latter.

Still more particularly an aim of the invention is to permanently control the conditions in which the cooling of the heated juice occurs, with the possibility of adjusting at any time the values of the pressures applied to ensure the condensation of the vapour, according to the required operating conditions.

To this end, the installation considered, for carrying out the cooling by evaporation of a juice heated to an initial temperature of the order of 65 to 90° C., constituted by a charged liquid and preferably juice from a harvested crop, comprising a vat supplied with continuous flow of this juice, which is subjected in this vat to several pressure reductions by sudden reduction of its pressure with the production of saturated vapour at the lower temperature created as a result of this reduction, said vat comprising at least two separate but superposed compartments, communicating with each other, respectively a first upper compartment and a second lower compartment, where the juice is subjected to these successive pressure reductions to two different and decreasing pressures, lower than that of the juice when it enters the vat, each compartment being connected to a condenser, capable of condensing the vapour produced by the pressure reduction, these condensers being serially mounted or parallel mounted and connected to a common vacuum pump by means of at least one control valve which can permanently adjust the pressure in each condenser to a value which is lower than the saturation vapour pressure corresponding to the temperature of the vapour created in each of these condensers is characterized in that the compartments of the vat are superposed and communicate with each other therein, by means of an opening through which the juice passes, which is closed either fully or partially by a variably positioned shutter element, creating a pulsed effect in order to remove the solid particles contained in the juice, this shutter element being self regulating as a function of the conditions of use of the installation As a result of putting the juice under reduced pressure in each of the successive compartments of the vat, there is produced a partial vaporization of the liquid phase contained in this juice and a lowering of the temperature within the mass to a value which depends only on this pressure.

However, because of the division of the vat into at least two separate and communicating compartments, where the pressures are adjusted by the vacuum pump and the control valves linked to the condensers to values that are different and decreasing from one to the next, the droplets produced in each of these condensers are of greater size, which allows them to be separated more easily and above all ensures that the majority of them fall back under the effect of gravity to the lower end of each compartment, and are not carried towards the corresponding condenser.

In each compartment, the mass flow rate of vapour produced is lower and, for the same entrainment speed, the difference between the temperature of the heated juice upon entry and the cooling temperature obtained, thus imposes the dimensions of the compartment of the corresponding vat, so that, when this difference is lesser, so are these dimensions.

As a result there is also a limitation to the superheating of the vapour, which makes it easier to condense it.

Moreover, the possibility of producing a vat of smaller size allows a more convenient transportation of it from one production site to another, unlike a unit with a single vat, with dimensions which are necessarily very large in order to allow the continuous treatment of a significant flow rate of juice.

Finally, as a consequence of this reduced temperature difference in each compartment the exchange surface in the linked condenser can also be smaller, requiring a more limited flow rate of cooling water, better compatible with the usual possibilities of each operation, in particular the water system available at the site.

Preferably, the shutter element is constituted by a conical shaped valve cooperating with a seat of the same profile installed in a dividing wall between the two compartments, in the shape of a funnel, this valve being integral with a float which is able to lift it from its seat to a distance which is a function of the quantity of liquid juice recovered in the bottom of the first compartment and to adjust the opening to the second compartment, which is arranged beneath the first.

The valve advantageously has a peripheral edge rounded at the top to allow it to be supported on its conical seat in the dividing wall and to absorb possible misalignments of it due to the turbulence of the liquid juice in the first compartment.

According to another distinctive characteristic, the valve is equipped with, at its base opposite its peripheral edge in its upper part, a stop plate, in this valve's maximum raised position.

Preferably also, the float moreover comprises a cover for protection from the liquid, held by the internal surface of the first compartment and which extends transversely above and at a distance from the float.

Advantageously, the protective cover of the float comprises vertical rods for guiding its movements in the first compartment.

According to yet another characteristic, the vat communicates in the upper compartment with a first condenser by means of a droplet-catching device to separate the produced vapours which are created in this condenser on the one hand, the drops and the solid particles charging the juice to be treated on the other hand. Preferably, this droplet-catching device is arranged in the upper part of this first compartment, to the right of a conduit linked with the condenser.

According to another aspect of the invention, the two condensers, linked respectively to the two compartments of the vat at different pressures, are arranged serially or in parallel by means of linking tubes, equipped with stop valves.

The condenser linked to the first compartment comprises upstream a first valve to create an adjustable loss of charge, which is able to adjust the pressure of the vapour in this condenser in order to allow its condensation.

According to yet another characteristic of the invention, the common vacuum pump, connected to the condensers, is a liquid ring pump, which is able to maintain the value of the pressure in these condensers at a value which is always lower than the saturation vapour pressure in the two compartments of the vat, so as to permanently produce the condensation of this vapour, no matter what its flow rate on entry into these condensers.

Advantageously, the vacuum pump comprises an ejector device, which can further reduce its pressure upstream.

Finally, the installation preferably comprises, at the outlet from the second compartment, in the lower part of the vat, a pump for extraction of the cooled juice, which can also extract the condensates from a container for recovering these, arranged at the outlet of the two condensers.

Using all of these characteristics and especially employing two superposed and communicating compartments, arranged inside the vat, while reducing the overall volume of the installation, allows the distribution of the pressures in each of these compartments to be uncoupled and managed, independently of the temperature of the juice upon leaving these. In this way, the breaking down of the structure of the berries and more generally of the components of the treated juice can be controlled independently of this temperature.

The invention moreover allows the cooled down liquid to be concentrated, while reducing the flow rate of the cooling water necessary and/or the temperature levels.

Other characteristics of an installation for cooling a liquid juice, made according to the invention, are also set out in the description which follows of an embodiment, given by way of example and which is not limiting, with reference to the attached drawings in which:

BRIEF DESCRIPTION OF THE DRAWING

FIG. 3 is a cross-section view, on a larger scale, illustrating the lower part of the first compartment of the vat with the shutter element of the opening between the two compartments.

FIG. 4 illustrates, on an even larger scale, the structure of the shutter element of FIG. 3.

FIG. 5 is a view of a detail of the shutter element.

In FIG. 1, reference 1 refers to a feed tank of the installation considered with a charged liquid juice, preferably constituted by a grape juice, this liquid being taken to a temperature comprised between approximately 65 and 90°, using means which are not represented, by direct or indirect heating, the heating conditions of the liquid juice, in particular by passing through a heat exchanger or by any other standard process, not directly being a part of the invention The heated juice on leaving the tank 1 is taken via a pipe 2 equipped with an inlet valve 3 to the upper part of a vat 4, produced according to the invention and which comprises in particular, in the embodiment being considered, two superposed compartments, respectively the upper compartment 5 and the lower compartment 6, these compartments being appreciably separated in the middle section of the vat by a dividing wall 7, preferably in the shape of a funnel and which comprises in its centre an opening 8 allowing communication to be established between the two compartments.

Figure 1:
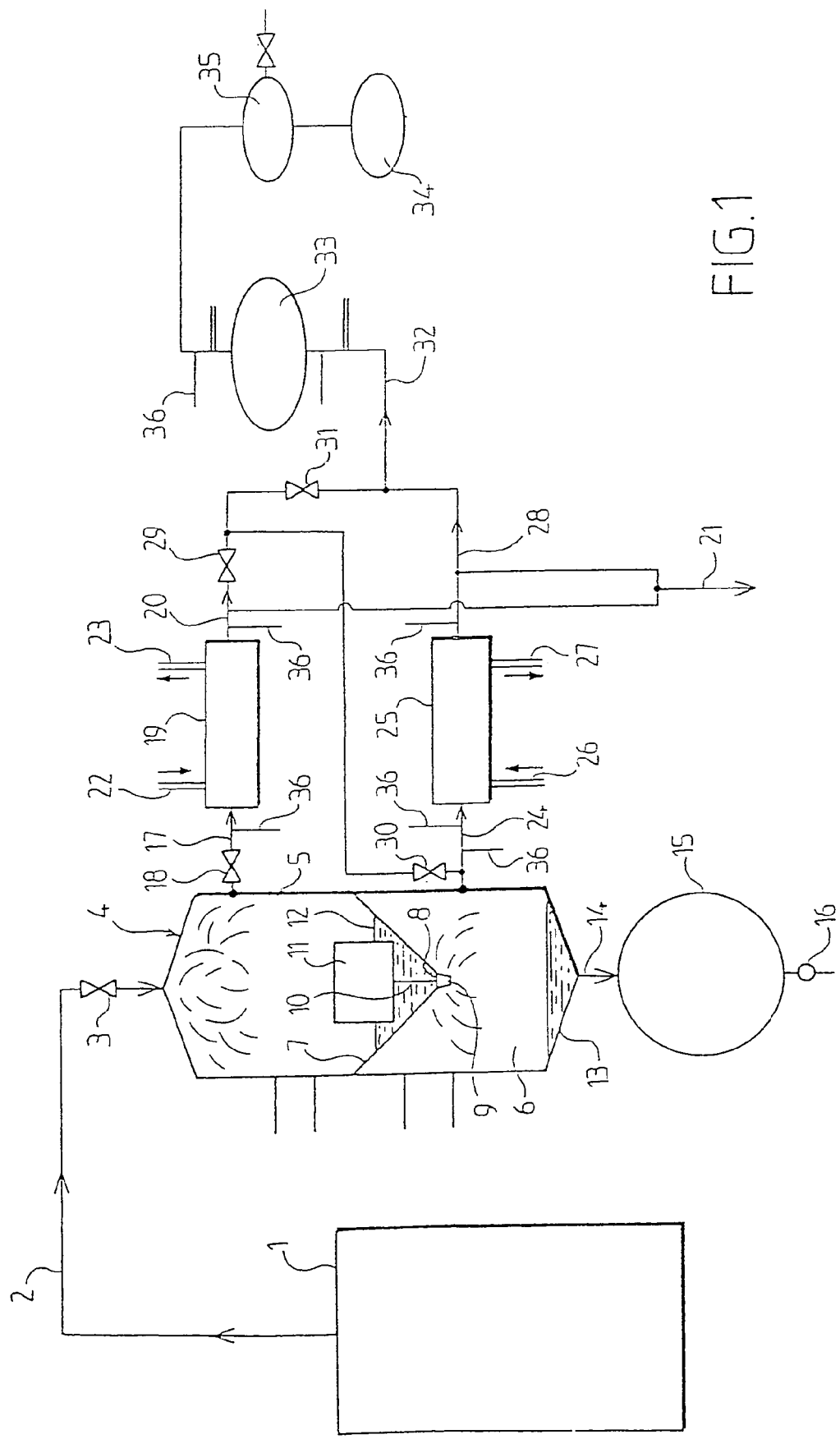
FIG. 1 is a diagram schematically illustrating all of the installation with its vat with two compartments and the different control and adjustment elements which are associated with it.

The opening 8 can be shut or conversely opened as a function of the relative position with respect to that of a shutter element 9, the production details of which are specified later, this shutter element being connected by a connecting rod 10 to a float 11 which allows the vertical variation of the position of the shutter element depending on the level 12 of the liquid collected at the base of the first compartment 5 against and above the wall 7.

The lower part of the vat 4 comprises a bottom 13, preferably also in shape of a funnel, which communicates through a conduit 14 with a container 15 where the liquid product coming out of the vat is collected, this container being connected, by means of a flow meter 16 or another measuring device equivalent to an evacuation pump (not represented), which returns this product towards other installations where it is subjected to an complementary treatment which is not directly related to the precise subject of the invention.

In particular, when the treated juice is a juice from a harvested crop, it can thus be conveyed to additional standard installations, in which the stages necessary for the winemaking process are carried out.

The first compartment 5 of the vat 4, situated in the upper section of the latter, comprises a conduit 17 equipped with a first valve 18 arranged upstream of a first vapour condenser 19, the condensed vapour produced being collected in an outlet conduit 20 and returned by evacuation tubes 21 into the liquid flow which comes out of the vat 4 through the container 15.

The condenser 19, called a high pressure condenser for the reasons which are set out below, as opposed to a similar condenser called a low pressure condenser, comprises pipes, respectively for inlet 22 and for evacuation 23, of an appropriate cooling liquid, usually water in continuous circulation.

The lower compartment 6 of the vat 4, arranged in the latter under the first compartment 5, also comprises an outlet conduit 24, which connects this compartment to a second condenser 25, called a low pressure condenser, the latter comprising, like the high pressure condenser 19, pipes 26 and 27 for inlet and for evacuation of an appropriate cooling liquid.

The condensed vapour which is evacuated from the condenser 25, is collected in an outlet pipe 28 and is also returned by the evacuation tubes 21 to the flow of liquid juice which leaves the container 15.

The two condensers 19 and 25, respectively linked to compartments 5 and 6 of the vat 4, can, depending on the case, be arranged serially or in parallel, thanks to valves 29, 30 or 31, respectively open or closed depending on the chosen assembly.

Moreover, the common outlet of the two condensers is connected by a conduit 32 to a flow meter 33 which is itself connected to a vacuum pump 34, preferably a liquid ring pump and advantageously by means of an ejector 35. Connection pieces 36 are provided at various points of the circuit for the installation of thermocouples, allowing the value of the temperatures at each of these points to be measured.

The operation of the installation described above consists essentially of subjecting the heated liquid juice, which runs into one, then into the other of each of the two compartments 5 and 6 of the vat 4, at a pressure very appreciably lower than that at which it is at before its entry into the vat, i.e. at atmospheric pressure, the pressure in the first upper compartment 5 being for example of the order of 100 mbar, while it is lowered to 30 mbar in the lower compartment 6.

Thus, the heated liquid juice, introduced into the lower section of the first compartment 5, will here be subjected to a sudden pressure reduction allowing it to be suddenly and partly vaporized, while taking it to a lower temperature, equal to that which corresponds to the saturation vapour pressure thus created in this compartment.

The vapour created, called high pressure vapour as opposed to that obtained subsequently in the second compartment 6, is collected through the conduit 17 and the valve 18 in the first condenser 19, where the cooling conditions and the loss of charge created by this valve, in combination with the effect of the vacuum pump 34, if appropriate associated with the ejector 35, allowing the complete condensation of this vapour and its possible return to the product coming out of the vat, as has already been indicated.

Advantageously, the vapours created by the pressure reduction of the heated liquid juice admitted into the first compartment 5, pass through a droplet catcher or separator (not represented), before being taken up by the conduit 17 and sent to the high pressure condenser 19, this conduit being connected to the compartment, at the upper section of the latter.

The pressure reduction of the heated juice moreover causes, inside the compartment 5, the formation of droplets of liquid which fall under the effect of gravity in this compartment and collect on the dividing wall 7, in the shape of a funnel, separating it from the second compartment 6.

The opening 8 provided in this wall is normally blocked by the shutter element 9, until the float 11 integral with this shutter element, carried by the level 12 of the liquid in the bottom of the first compartment 5, is raised from its seat and thus opens the communication between the compartments 5 and 6, before it returns to its initial position and is raised again, the pulsed effect created by this shutter element in particular allowing the effective evacuation of the solid particles contained in the juice.

The liquid already cooled following the pressure reduction created in the upper compartment 5, is now subjected in the second compartment to another pressure reduction where the vapour produced is this time collected under the same conditions as previously by the so-called low pressure condenser 25, the temperature in the second compartment being again reduced as a function of the operating conditions created and in particular of the saturation vapour pressure in this compartment.

The liquid fraction collected at the base of the vat 4 in the bottom of the second compartment 6 is thus brought back to a temperature considerably lower than that of the juice in the feed tank 1, in particular passing from approximately 80 to 30° C., the two successive pressure reductions produced allowing a satisfactory breakdown of the structure of the grapes and the obtaining of a final product in which the content of organoleptic components is very noticeably improved.

As already indicated, it is thus ascertained that this arrangement with two compartments superposed in the vat, allows the distribution of the pressures inside each of these compartments to be uncoupled and managed, the breakdown of the structure of the solid elements contained in the juice being able to be controlled independently of its outlet temperature.

Figure 2:
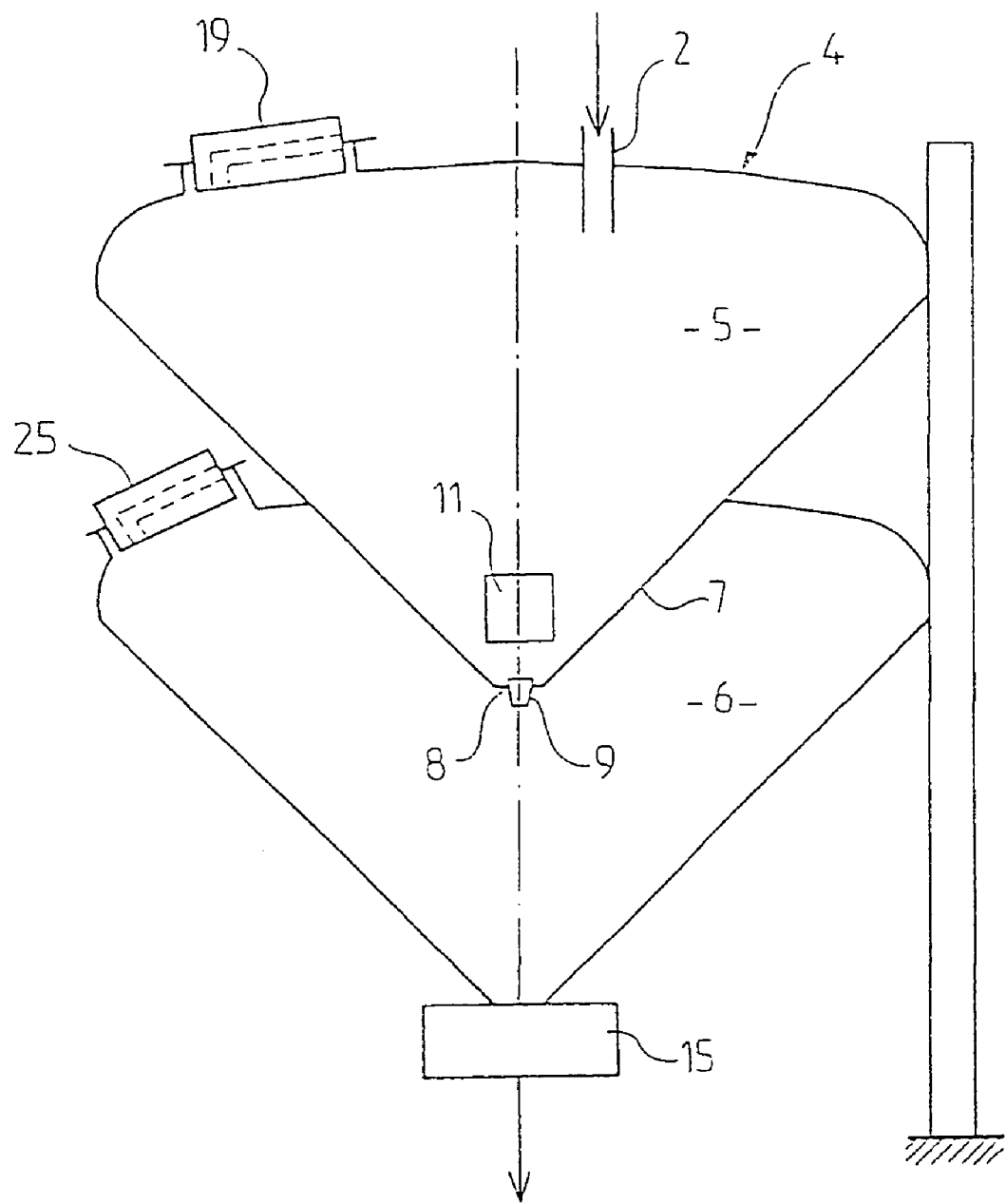
FIG. 2 is a schematic view in axial section of an embodiment of the vat considered.

FIG. 2 illustrates a preferred embodiment of a vat 4 according to the invention comprising two superposed compartments 5 and 6, respectively associated with two condensers of the produced vapour, one of them 19, connected to the upper compartment 5, being called a high pressure condenser, while the other, connected to the lower compartment 6, is called a low pressure condenser, the vapours obtained by pressure reduction of the heated liquid juice in these successive compartments being at different pressures, simultaneously taking the liquid to temperatures which are distinct and lower from one to the next.

FIGS. 3 to 5 illustrate a particular embodiment of the shutter element 9 of the float 11 linked by the rod 10.

This shutter element 9 advantageously has a conical profile, with an upper lip 37 having a rounded peripheral edge 38, so as to come to bear against the dividing wall 7, even in the case of a slight misalignment of the shutter element, when the latter is not raised from its seat 39, to the same level as the opening 8, between the superposed compartments 5 and 6.

The shutter element 9 preferably comprises a blind hole 40 into which is inserted a rod 41 which ends in a transversal plate 42, which can abut against a support 43 provided under the dividing wall 7, this support thus limiting the maximum raising of the shutter element 9 by its float 11, as the level of the liquid collected in the bottom of the first compartment 5 increases.

Advantageously, during the successive upward and downward movements of the float 11 under the effect of the variations of the level 12 of the liquid in this compartment 5, with the pulsed effect which results for the valve 9, this float is guided by means of vertical rods 44, held by a cover 45 fixed by lugs 46 against the internal wall of the compartment, as illustrated in FIG. 3.

Thus an installation is produced which allows the cooling of a charged liquid and in particular a juice from a harvested crop, in a way which has numerous advantages, this cooling, for a given liquid flow at the inlet, being ensured so that it allows, in a way that is in itself known, effective mechanical disorganization of the cells of the grape skins with the advantages which result from this to optimize the qualities of this juice to subsequently make it into wine.

In particular, the production of the pressure reduction vat in at least two separate compartments allows the successive temperature levels to which the juice is taken to be stepped, by obtaining in each compartment a larger liquid drop size, in particular limiting a entrainment of these with the vapour, which facilitates the operation of the condensers and improves their efficiency.

The dimensions of these condensers can moreover be reduced; in addition, the flow rates of the cooling liquid taken to these condensers can be lower and/or the temperature of the liquid higher, so that the operating conditions, and in particular the pressure created by the control valve and the vacuum pump in the compartments of the vat in order to reach the desired temperatures following the pressure reductions and the evaporation of the juice in the two successive compartments, are better suited to a transportable installation and are less costly, able to operate on site, directly where the harvesting is carried out.

Of course, it goes without saying that the invention is not limited to the embodiment more specifically described above with reference to the attached drawings; on the contrary it encompasses all the variants.

The invention claimed is:

1. Installation for cooling by evaporation of a liquid, comprising: a vat; at least two condensers; at least one control valve, at least one variably positioned shutter element and a vacuum pump;

said vat comprising an inlet, an outlet, a first compartment and a second compartment, wherein said first compartment is positioned above said second compartment and a dividing wall is arranged between said first compartment and said second compartment, wherein said at least one variably positioned shutter element is present in said dividing wall and accommodates liquid communication between the first compartment and the second compartment when the shutter element is in an open position, said inlet being connected to said first compartment, said outlet being connected to said second compartment, wherein each of said compartments is connected to a respective one of the condensers and each of said condensers is connected to a common vacuum pump, wherein each of the respective connections between said compartments and said condensers comprises at least one of said at least one control valve, wherein said control valve is adapted to adjust a pressure in each condenser to a pressure lower than the saturation vapor pressure corresponding to the temperature of the vapor created in said condenser, wherein said at least one variably positioned shutter element changes position between an open and closed position based on a level of liquid present in said first compartment and said changing of position results in a reduction of pressure within the first compartment and the second compartment.

2. Installation according to claim 1, wherein the at least one variably positioned shutter element comprises a conical shape, wherein the at least one variably positioned shutter element contacts a seat with a conical profile, wherein the seat is located in a dividing wall separating the first compartment from the second compartment, wherein the dividing wall is in the shape of a funnel, the at least one variably positioned shutter element being integral with a float which is able to raise the at least one variably positioned shutter element from its seat to a distance which is a function of the quantity of liquid juice collected in the bottom of the first compartment, and to adjust the opening between the first compartment and the second compartment.

3. Installation according to claim 2, wherein the float comprises a cover connected to the internal surface of the first compartment and which extends transversely over the float and at a distance above the float.

4. Installation according to claim 3, wherein the cover comprises vertical rods for guiding its movements in the first compartment.

5. Installation according to claim 1, wherein the at least one variably positioned shutter element comprises a rounded peripheral edge.

6. Installation according to claim 1, wherein the at least one variably positioned shutter element is equipped at its base, opposite its peripheral edge, with a stop plate, wherein said stop plate limits the maximum raised position of the shutter element.

7. Installation according to claim 1, wherein the first compartment is connected to a first condenser by means of a droplet-catching device for separating the produced vapors created in said condenser.

8. Installation according to claim 7, wherein the first compartment comprises an upper section and the droplet-catching device is positioned in the upper section of the compartment.

9. Installation according to claim 1, wherein the at least two condensers are connected serially or in parallel by tubes equipped with stop valves.

10. Installation according to claim 1, wherein the vacuum pump is a liquid ring pump.

11. Installation according to claim 1, wherein said vacuum pump comprises an ejector device.

12. Installation according to claim 1, further comprising a pump for extraction of the liquid, where said pump for extraction of the liquid is connected to the lower compartment at the outlet of said second compartment.

* * * * *